United States Patent
Lee

(10) Patent No.: US 7,944,228 B2
(45) Date of Patent: May 17, 2011

(54) MOTHER SUBSTRATE, SUBSTRATE FOR DISPLAY PANEL AND METHOD OF MANUFACTURING DISPLAY PANEL

(75) Inventor: Back-Won Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 12 days.

(21) Appl. No.: 12/421,228

(22) Filed: Apr. 9, 2009

(65) Prior Publication Data

US 2009/0195745 A1 Aug. 6, 2009

Related U.S. Application Data

(63) Continuation of application No. 11/556,463, filed on Nov. 3, 2006, now Pat. No. 7,532,025, which is a continuation of application No. 10/777,990, filed on Feb. 11, 2004, now Pat. No. 7,145,357.

(30) Foreign Application Priority Data

Jul. 14, 2003 (KR) .................. 2003-47723

(51) Int. Cl.
*G01R 31/26* (2006.01)

(52) U.S. Cl. .............. 324/760.01; 345/904; 349/40; 349/149

(58) Field of Classification Search .............. None
See application file for complete search history.

(56) References Cited

U.S. PATENT DOCUMENTS

| | | | |
|---|---|---|---|
| 5,148,301 A | 9/1992 | Sawatsubashi et al. | |
| 5,576,730 A | 11/1996 | Shimada et al. | |
| 5,754,158 A | 5/1998 | Misawa et al. | |
| 6,411,359 B1 | 6/2002 | Kobayashi et al. | |
| 6,750,926 B2 | 6/2004 | Ohgiichi et al. | |
| 6,781,403 B2 | 8/2004 | Kim | |
| 6,839,121 B2 | 1/2005 | Kim et al. | |
| 7,145,357 B2 | 12/2006 | Lee | |
| 7,532,025 B2 * | 5/2009 | Lee ........................ | 324/770 |
| 2002/0084965 A1 | 7/2002 | Park | |
| 2003/0030464 A1 | 2/2003 | Tomita | |
| 2003/0117165 A1 | 6/2003 | Kim | |

FOREIGN PATENT DOCUMENTS

| | | |
|---|---|---|
| JP | 02-267527 A | 11/1990 |
| JP | 2002-229056 A | 8/2002 |

OTHER PUBLICATIONS

Chinese Office Action for application No. 200410008429.1 with English Translation; Issue date Jul. 6, 2007.

* cited by examiner

*Primary Examiner* — Minh N Tang
(74) *Attorney, Agent, or Firm* — Cantor Colburn LLP

(57) ABSTRACT

In a mother substrate for a lower substrate, a substrate for a display panel and a method of manufacturing a display panel, the substrate for the display panel includes a lower substrate and an upper substrate facing the lower substrate. The lower substrate includes an inspection line that receives a first inspection signal externally provided, a gate driving part that outputs a second inspection signal in response to the first inspection signal from the inspection line, and a pixel part driven in response to the second inspection signal. The inspection line is disposed on a grinding area. Thus, the display panel may have an enhanced productivity and an improved yield, on which the gate driving part is formed.

11 Claims, 11 Drawing Sheets

CKVB  CKV  VSS  STV

MOTHER SUBSTRATE, SUBSTRATE FOR DISPLAY PANEL AND METHOD OF MANUFACTURING DISPLAY PANEL

CROSS-REFERENCE TO RELATED APPLICATION

This application is a continuation application of U.S. application Ser. No. 11/556,463 (now U.S. Pat. No. 7,532,025), filed on Nov. 3, 2006, which is a continuation application of U.S. application Ser. No. 10/777,990 (now U.S. Pat. No. 7,145,357), filed on Feb. 11, 2004, which claims priority to Korean Patent Application No. 2003-47723, filed on Jul. 14, 2003, and all the benefits accruing therefrom under 35 U.S.C. §119, the contents of which in its entirety are herein incorporated by reference.

BACKGROUND OF THE INVENTION

1. Field of the Invention

The present invention relates to a mother substrate, a substrate for a display panel and a method of manufacturing a display panel, and more particularly to a mother substrate capable of improving productivity and yield of a display panel on which a driver is disposed, a substrate for a display panel and a method of manufacturing a display panel.

2. Description of the Related Art

An LCD apparatus, in general, includes a liquid crystal display (LCD) panel, gate and data drivers for driving the LCD panel.

An LCD panel includes a lower substrate, an upper substrate facing the lower substrate, and a liquid crystal layer disposed between the lower and upper substrates. The lower substrate includes a data line extended in a first direction, a gate line extended in a second direction substantially perpendicular to the first direction, and a pixel disposed at a pixel area defined by the gate and data lines and connected to the gate and data lines. The pixel includes a thin film transistor (TFT) and a pixel electrode used as a first electrode of a liquid crystal capacitor connected to the TFT.

The gate driver is connected to the gate line so as to output a gate driving signal, and the data driver is connected to the data line so as to output a data signal. In general, the gate and data drivers may be packed and mounted on the LCD panel or on a tape carrier package as a chip shape, and electrically connected with the LCD panel.

In case that the gate driver is directly mounted on the LCD panel, an inspection process is performed before the gate driver is mounted on the LCD panel so as to inspect that whether or not the LCD panel is operated in normal. That is, the gate driver is mounted only on the LCD panel that is operated in normal.

However, the gate driver, recently, is directly mounted on an end upper surface of the lower substrate while the TFT is formed on the LCD panel. Accordingly, an inspection method capable of inspecting the LCD on which the gate driver is already mounted is required.

BRIEF SUMMARY OF THE INVENTION

The present invention provides a mother substrate capable of improving yield and productivity of a display panel on which a gate driver is mounted.

The present invention also provides a substrate for display panel capable of improving yield and productivity of a display panel on which a gate driver is mounted.

The present invention also provides a method suitable for manufacturing the above display panel.

In one aspect of the invention, a mother substrate includes a plurality of display cells and an inspecting pad part.

Each of the display cells has an inspection line receiving a first inspection signal externally provided, a driving part outputting a second inspection signal in response to the first inspection signal provided through the inspection line, and a pixel part being driven in response to the second inspection signal. The inspecting pad part is extended from the inspection line so as to provide the first inspection line to the inspection line.

In another aspect of the invention, a substrate for a display panel includes a lower substrate and an upper substrate facing the lower substrate.

The lower substrate has an inspection line receiving a first inspection signal externally provided, a driving part outputting a second inspection signal in response to the first inspection signal provided through the inspection line, and a pixel part being driven in response to the second inspection signal.

In still another aspect of the invention, in order to manufacture a display panel, a lower substrate and an upper substrate facing the lower substrate are fabricated. The lower substrate has an inspection line receiving a first inspection signal externally provided, a driving part outputting a second inspection signal in response to the first inspection signal provided through the inspection line, and a pixel part being driven in response to the second inspection signal. The upper substrate is assembled with the lower substrate.

The first inspection signal is provided to the inspection line so as to inspect the driving part and pixel part. Also, an edge of the lower substrate is grinded so as to insulate the inspection line from input lines formed on the lower substrate.

According to the mother substrate, substrate for the display panel and the method of manufacturing the display panel, the display panel, on which the gate driving part is formed, may be easily inspected while the display panel is manufactured, or after the mother substrate and the substrate for the display panel are completed. Thus, the display panel may have an enhanced productivity and an improved yield.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
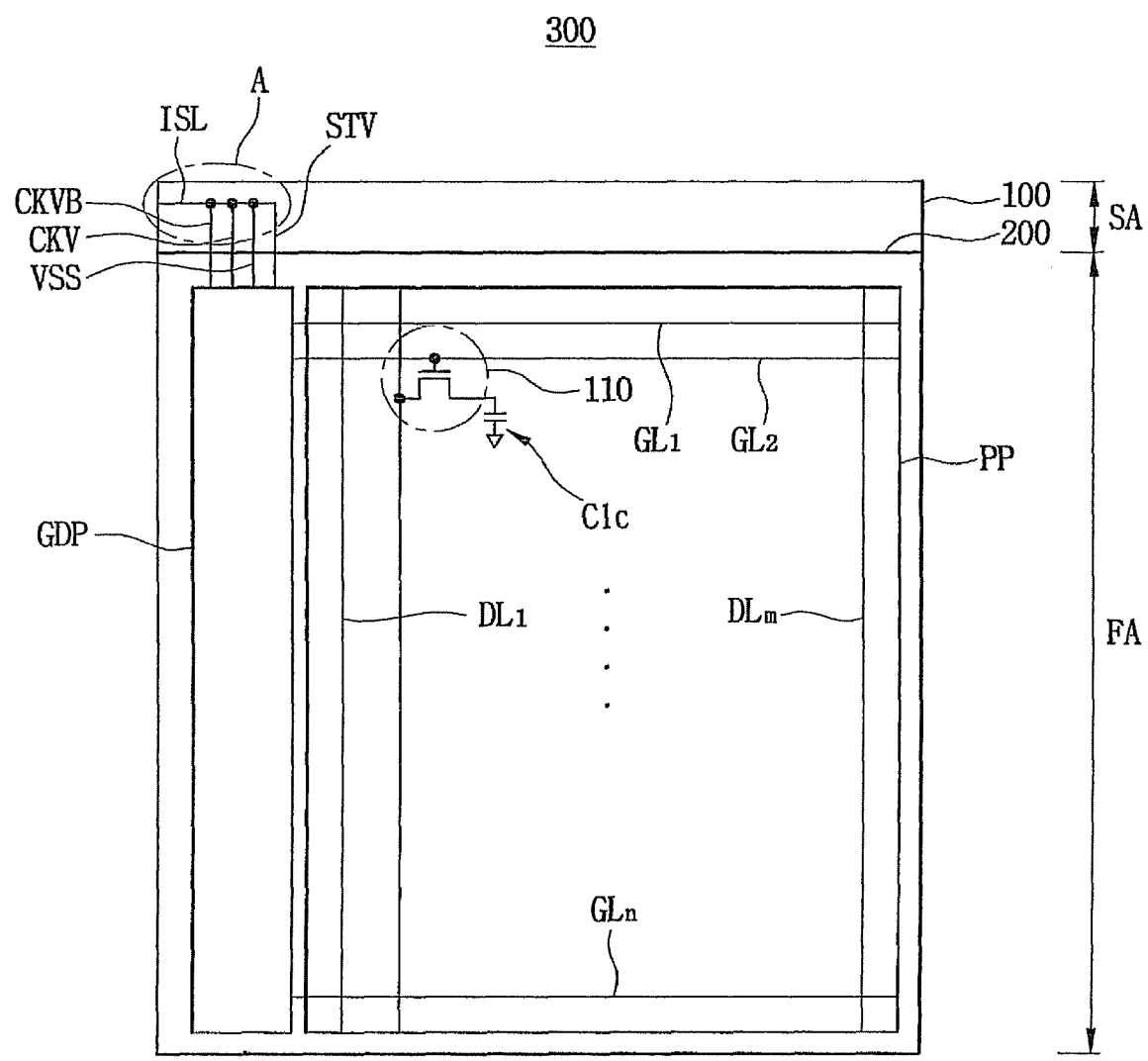
FIG. 1 is a schematic view showing an assemble substrate for a display panel according to an exemplary embodiment of the present invention.

FIG. 1 is a schematic view showing an assemble substrate for a display panel according to an exemplary embodiment of the present invention.

Referring to FIG. 1, an assembled substrate 300 for a display panel includes a lower substrate 100 and an upper substrate 200 facing the lower substrate 100.

The upper substrate 200 has a size smaller than that of the lower substrate 100. Thus, the lower substrate 100 may be divided into a first area FA facing the upper substrate 200 and a second area SA not facing the upper substrate 200.

The lower substrate 100 includes a pixel part PP for displaying an image and a gate driving part GDP for driving the pixel part PP.

The pixel part PP includes a plurality of gate lines GL1-GLn and a plurality of data lines DL1-DLm substantially perpendicular to the gate lines GL1-GLn. A TFT 110 and a pixel electrode that operates as a first electrode of a liquid crystal capacitor Clc are disposed at an area defined by the gate lines GL1-GLn and data lines DL1-DLm.

The gate driving part GDP is connected to ends of the gate lines GL1-GLn so as to output a driving signal to the gate lines GL1-GLn. The gate driving part GDP is electrically connected to input lines, for example, such as a start signal input line STV that receives various signals externally provided, a first clock input line CKV, a second clock input line CKVB and a ground voltage input line VSS.

The input lines STV, CKV, CKVB and VSS are spaced apart from each other and substantially parallel to each other. The input lines STV, CKV, CKVB and VSS are extended from the gate driving part GDP to the second area SA so as to receive various signals externally provided. Also, the input lines STV, CKV, CKVB and VSS are formed on the lower substrate 100.

The lower substrate 100 includes an inspection line ISL electrically connected to the input lines STV, CKV, CKVB and VSS and formed on the second area SA. Thus, the input lines STV, CKV, CKVB and VSS are electrically connected to each other by means of the inspection line ISL. The inspection line ISL receives an inspection signal externally provided, and provides the received inspection signal to the input lines STV, CKV, CKVB and VSS.

Figure 2:
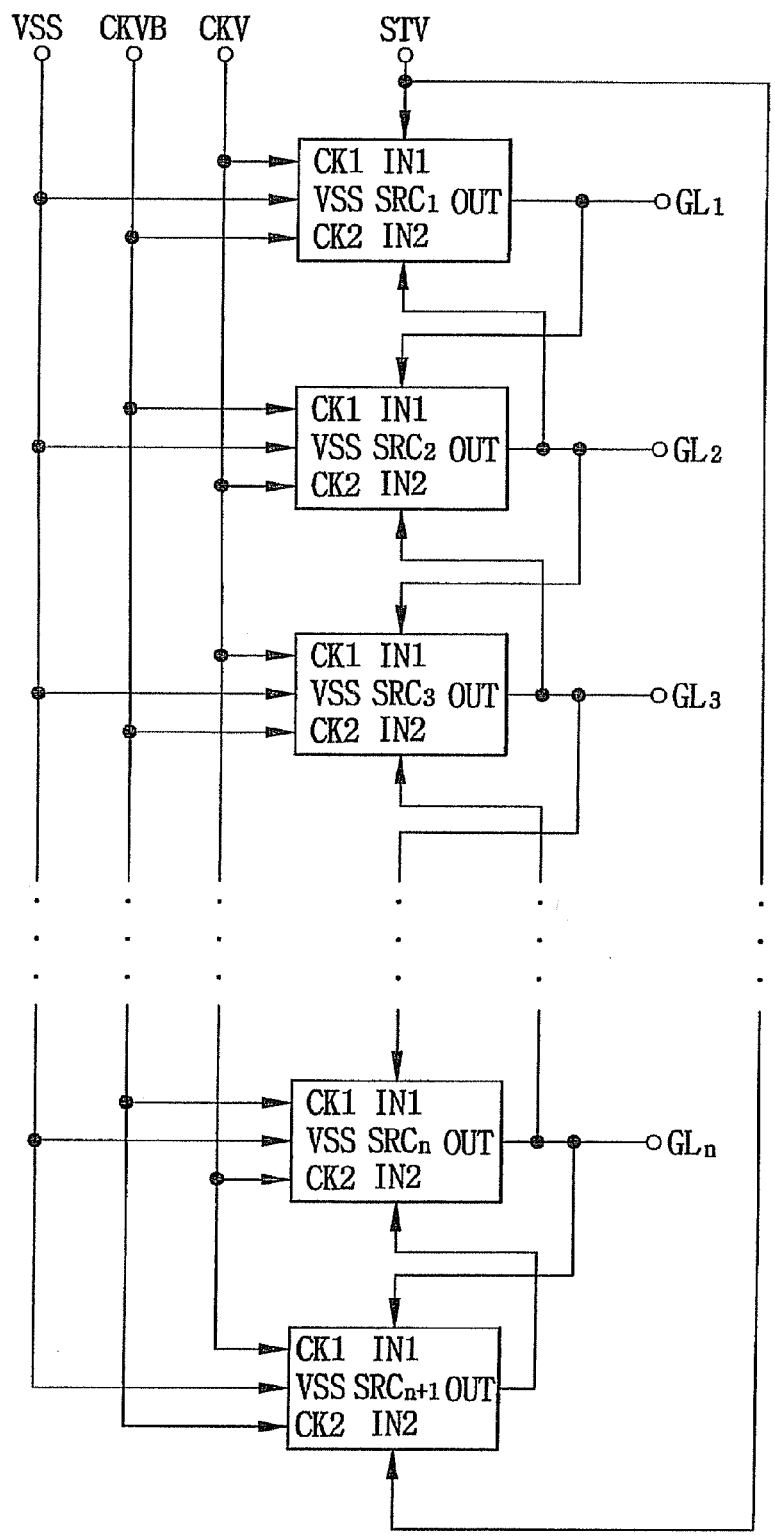
FIG. 2 is a schematic view showing the gate driving part and input lines shown in FIG. 1.

FIG. 2 is a schematic view showing the gate driving part and input lines shown in FIG. 1.

Referring to FIG. 2, the gate driving part GDP includes a shift register in which plural stages SRC1-SRCn+1 are connected one after another to each other.

Each of the stages SRC1-SRCn+1 includes a first clock terminal CK1, a second clock terminal CK2, a first input terminal IN1, a second input terminal IN2, an output terminal OUT and a ground voltage terminal VSS.

Odd stages SRC1, SRC3, ..., SRCn+1 of the plural stages SRC1-SRCn+1 receive a first clock signal CKV through the first clock terminal CK1 thereof, and even stages SRC2, ..., SRCn of the plural stages SRC1-SRCn+1 receive a second clock signal CKVB having a phase opposite to the first clock signal CKV through the first clock terminal CK1.

Also, odd stages SRC1, SRC3, ..., SRCn+1 of the plural stages SRC1-SRCn+1 output the first clock signal CKV through the output terminal OUT thereof, and even stages SRC2, ..., SRCn of the plural stages SRC1-SRCn+1 output the second clock signal CKVB through the output terminal OUT thereof.

The output terminal OUT of each plural stage SRC1-SRCn is electrically connected to a corresponding gate line of the gate lines GL1-GLn formed at the pixel part PP (shown in FIG. 1). Thus, the shift register may sequentially drive the gate lines GL1-GLn.

The first input terminal IN1 receives an output signal outputted from the output terminal OUT of a previous stage, and the second input terminal IN2 receives an output signal outputted from the output terminal OUT of a next stage.

In this exemplary embodiment, the first input terminal IN1 of a first stage SRC1 receives a start signal STV in lieu of the output signal of the previous stage. The n+1-numbered stage SRCn+1 receives the start signal STV in lieu of the output signal of the next stage through the second input terminal IN2 thereof.

Figure 3:
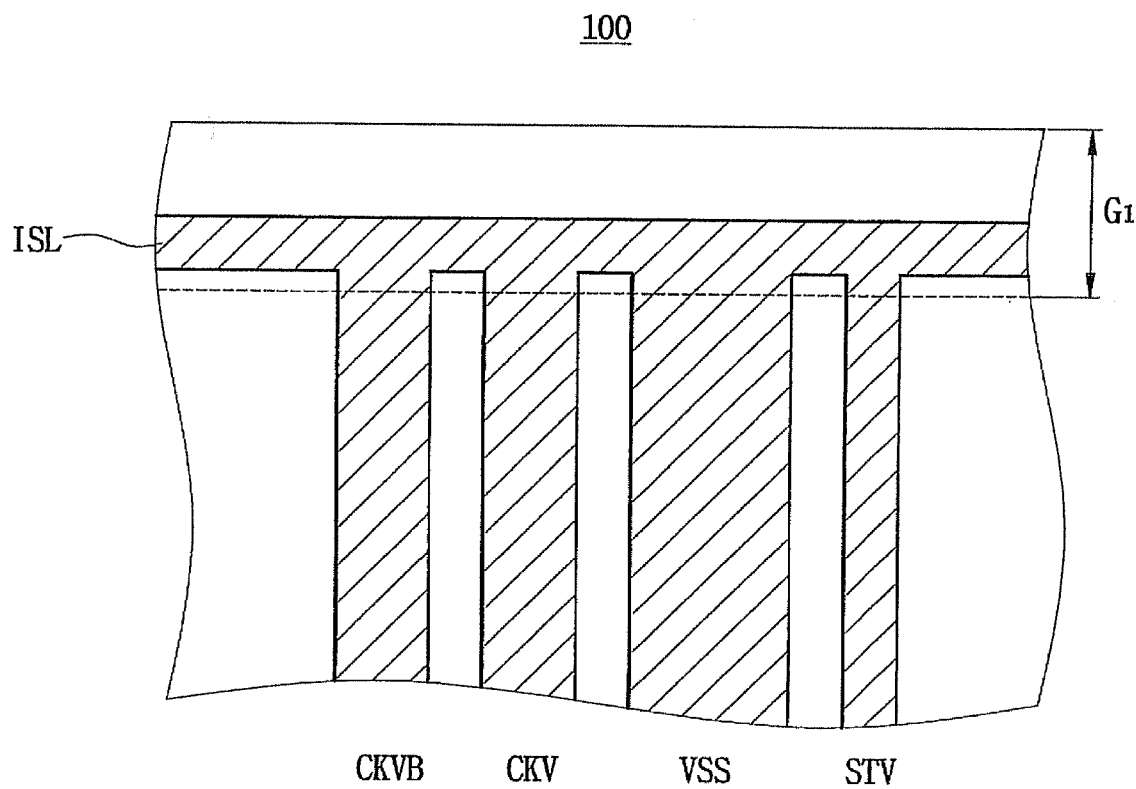
FIG. 3 is an enlarged view showing a portion "A" of FIG. 1.
Figure 4:
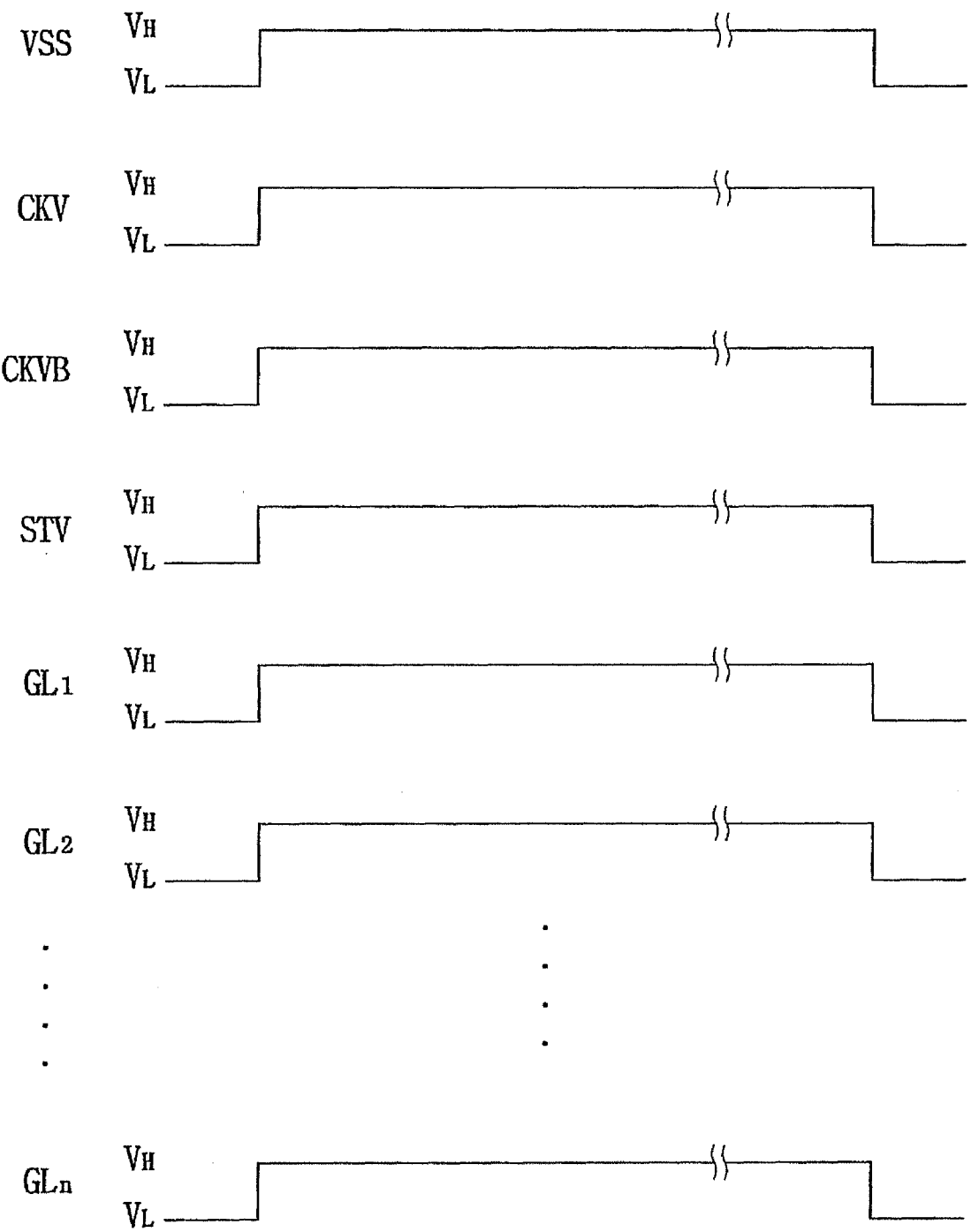
FIG. 4 is waveforms of signals applied to the input lines and gate lines shown in FIG. 1.

FIG. 3 is an enlarged view showing a portion "A" of FIG. 1. FIG. 4 is waveforms of signals applied to the input lines and gate lines shown in FIG. 1.

Referring to FIG. 3, the inspection line ISL is formed at the second area SA of the lower substrate 100, and commonly connected to the start signal input line STV, ground voltage input line VSS, first clock input line CKV and second clock input line CKVB.

The inspection line ISL is placed at a grinding area G1, and electrically connected to the start signal input line STV, ground voltage input line VSS, first clock input line CKV and second clock input line CKVB in the grinding area G1. The grinding area G1 is grinded through a grinding process before the display panel (not shown) is completed.

In this exemplary embodiment, the ground voltage input line VSS has a width wider than those of the start signal input line STV, first clock input line CKV and second clock input line CKVB. Thus, the inspection signal is primarily provided to the ground voltage input line VSS, and the inspection signal provided to the ground voltage input line VSS may be provided to the start signal input line STV, first clock input line CKV and second clock input line CKVB through the inspection line ISL.

Especially, in case of inspecting the display panel through a visual inspection process after the display panel is completed, the inspection signal is primarily provided to the ground voltage input line VSS so as to precisely provide the inspection signal to the ground voltage input line VSS. Then, the inspection signal is provided to the start signal input line STV, first clock input line CKV and second clock input line CKVB through the inspection line ISL.

As shown in FIG. 4, the inspection signal having a predetermined voltage level is provided to the start signal input line STV, first clock input line CKV, second clock input line CKVB and ground voltage input line VSS, respectively.

The inspection signal is provided to each stage SRC1-SRCn of the gate driving part GDP through the input lines STV, CKV, CKVB and VSS so as to drive the plural stages SRC1-SRCn. Thus, the driving signal is substantially simultaneously provided to the gate lines GL1-GLn connected to the plural stages SRC1-SRCn.

Although not shown in FIG. 4, the data lines DL1-DLm formed at the pixel part PP (refer to FIG. 1) also receive the inspection signal. The data lines DL1-DLm may be connected as one group or as in different groups so as to receive the inspection signal. The different groups may include a first group having even data lines and a second group having odd data lines.

When the inspection signal is provided to the data lines DL1-DLm and gate lines GL1-GLn, the assembled substrate 300 for the display panel displays an image. Thus, a user (or an inspector) may inspect the assembled substrate 300 for the display panel with naked eye.

Figure 5:
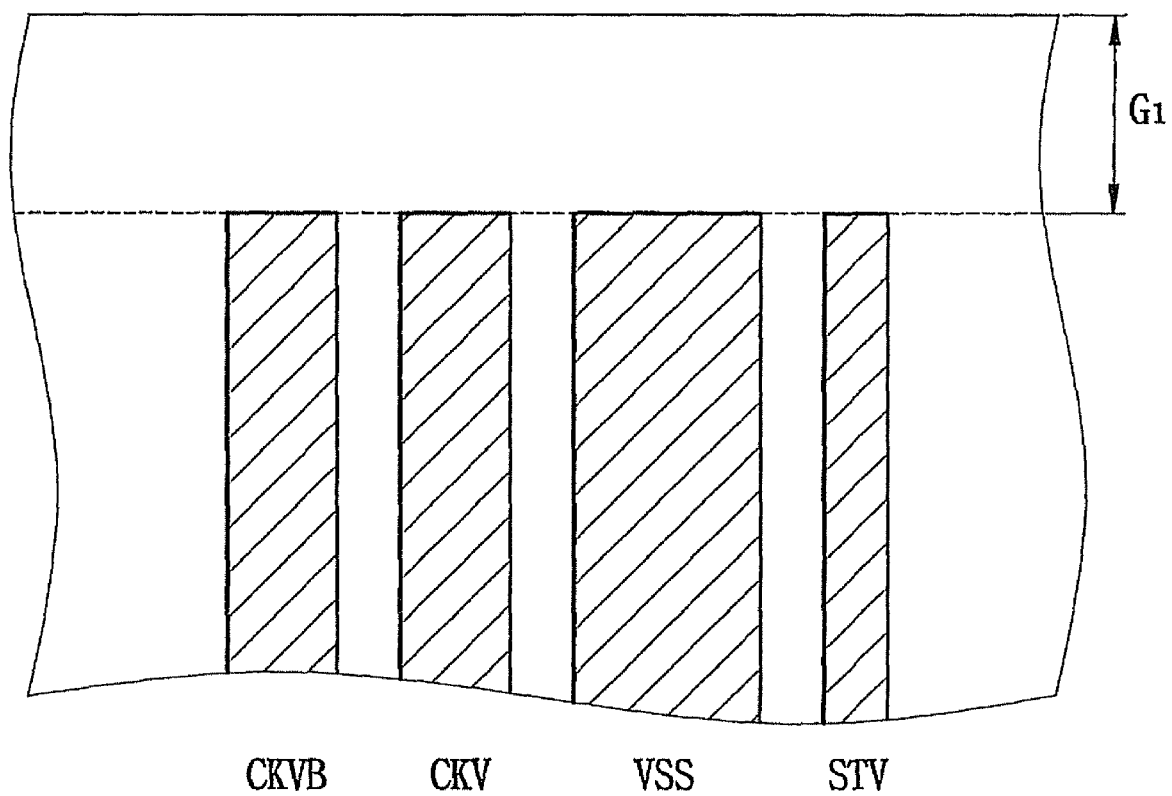
FIG. 5 is a schematic view showing a grinded display panel.
Figure 6:
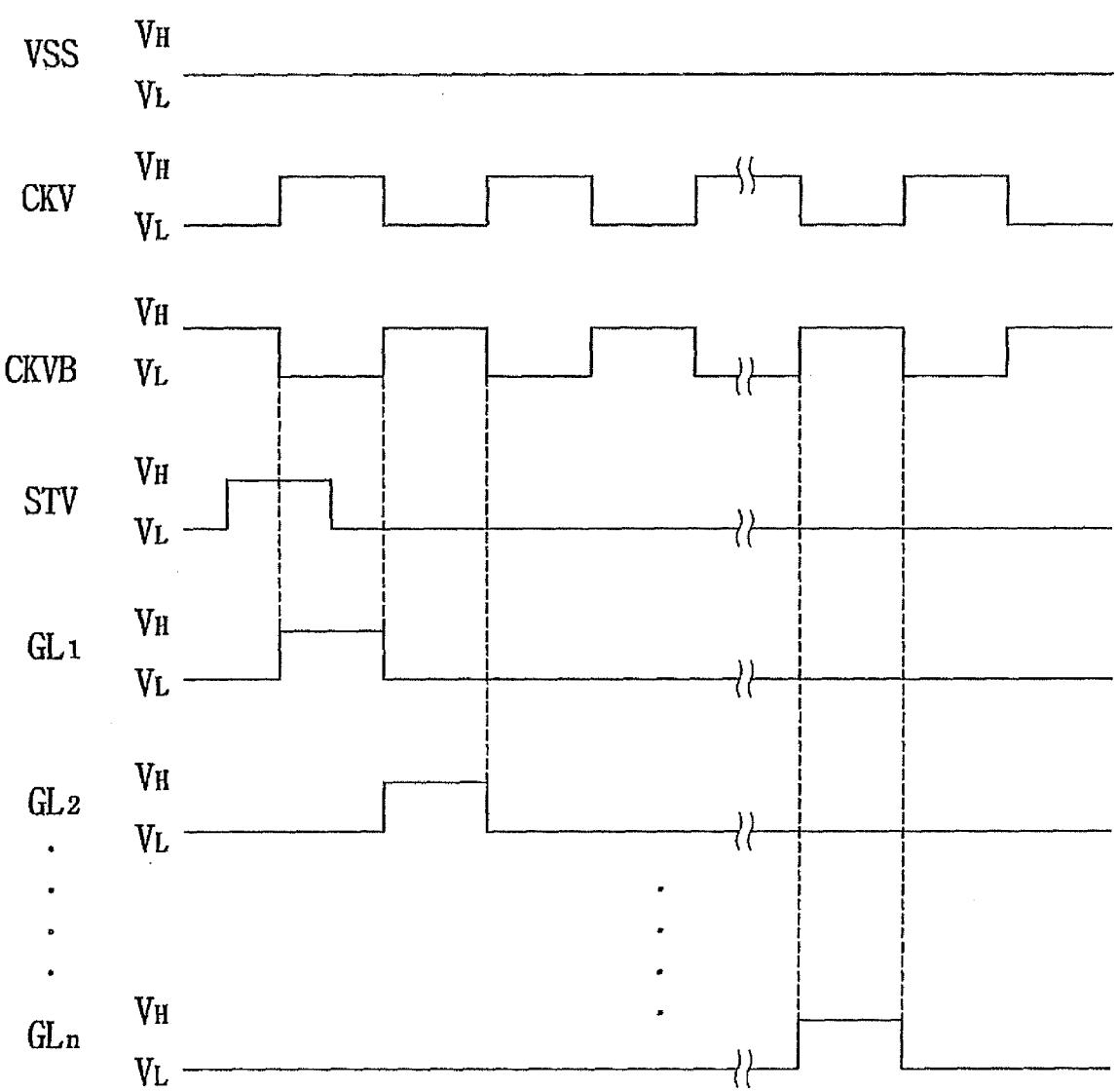
FIG. 6 is waveforms of signals applied to the input lines and gate lines while an image is displayed on the display panel.

FIG. 5 is a schematic view showing a grinded display panel, and FIG. 6 is waveforms of signals applied to the input lines and gate lines while an image is displayed on the display panel.

Referring to FIG. 5, the assembled substrate 300 for the display panel inspected through the visual inspection process is completed as the display panel through the grinding process. The lower substrate 100 may have an edge having a smooth surface by grinding the grinding area G1 through the grinding process.

The grinded display panel includes the input lines STV, CKV, CKVB and VSS thereon, which are spaced apart from each other and insulated from each other. That is, the inspection line ISL electrically connected to the start signal input line STV, first clock input line CKV, second clock input line CKVB and ground voltage input line VSS is removed from the lower substrate 100 by the grinding process.

Thus, the start signal input line STV, first clock input line CKV, second clock input line CKVB and ground voltage input line VSS may be insulated from each other.

As shown in FIG. 6, in order to drive the pixel part PP of the display panel, the start signal, first clock signal, second clock signal and ground voltage are provided to the start signal input line STV, first clock input line CKV, second clock input line CKVB and ground voltage input line VSS, respectively.

The gate driving part GDP outputs the driving signal to the gate lines GL1-GLn through the plural stages SRC1-SRCn in response to the start signal, first clock signal, second clock signal and ground voltage, thereby driving the pixel part PP of the display panel.

Figure 7:
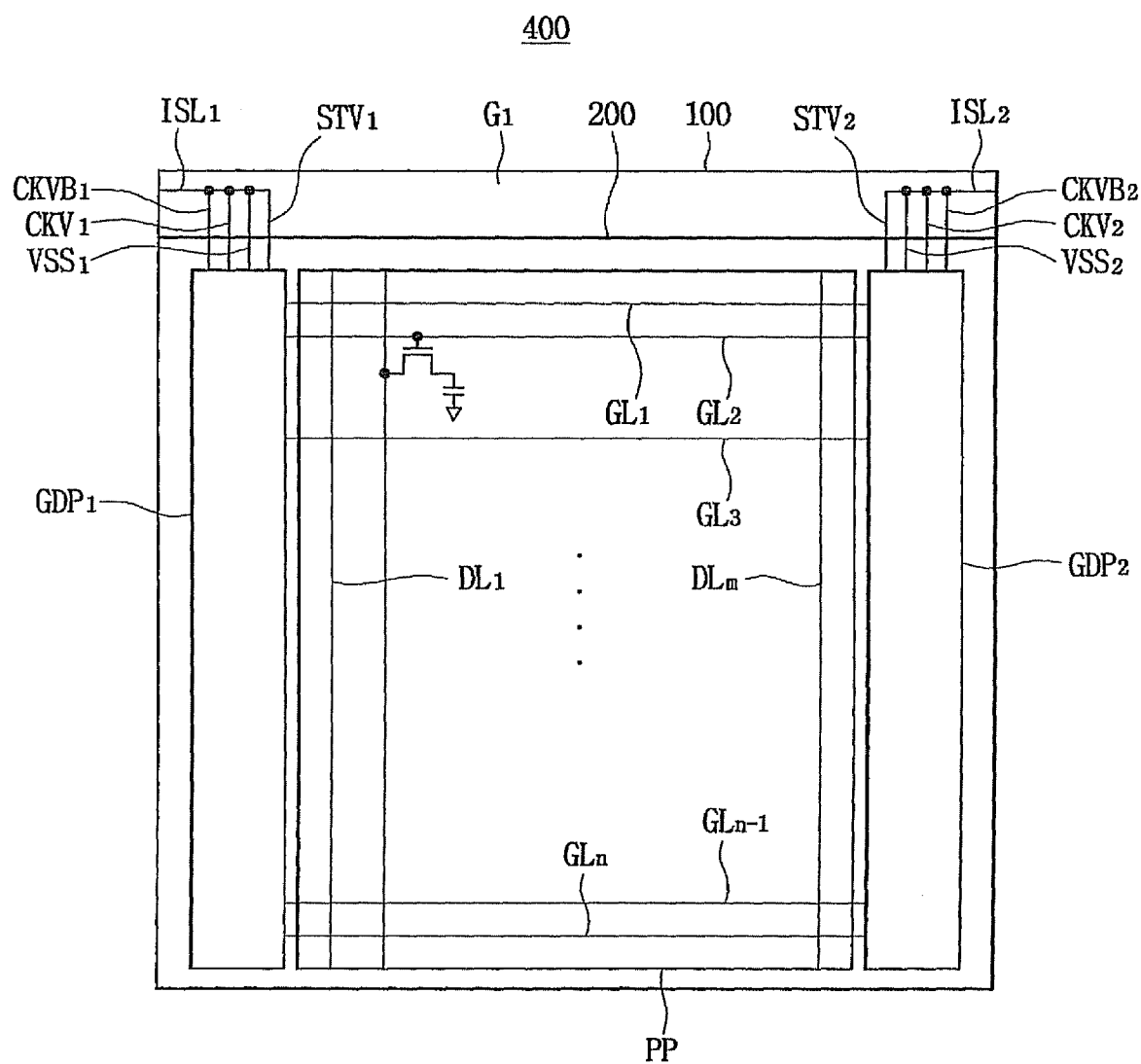
FIG. 7 is a schematic view showing an assembled substrate for a display panel according to another exemplary embodiment of the present invention.

FIG. 7 is a schematic view showing an assembled substrate for a display panel according to another exemplary embodiment of the present invention. In FIG. 7, the same reference numerals denote the same elements in FIG. 1, and thus the detailed descriptions of the same elements will be omitted.

Referring to FIG. 7, an assembled substrate 400 for a display panel according to another exemplary embodiment of the present invention includes a lower substrate 100 and an upper substrate 200 facing the lower substrate 100.

The lower substrate 100 includes a pixel part PP that displays an image, a first gate driving part GDP1 disposed at a left side of the pixel part PP and a second gate driving part GDP2 disposed at a right side of the pixel part PP.

The first gate driving part GDP1 is connected to first ends of gate lines GL1-GLn so as to output a driving signal to odd gate lines GL1, ..., GLn−1 of the gate lines GL1-GLn. Also, the second gate driving part GDP2 is connected to second ends of the gate lines GL1-GLn so as to output the driving signal to even gate lines GL2, ..., GLn.

The first gate driving part GDP1 is electrically connected to input lines, for example, such as a first start signal input line STV1, a first clock input line CKV1, a second clock input line CKVB1 and a first ground voltage input line VSS1 that receive various signal externally provided.

The lower substrate 100 includes a first inspection line ISL1 formed at a grinding area G1 (refer to FIG. 3) and electrically connected to the input lines STV1, CKV1, CKVB1 and VSS1. Thus, the input lines STV1, CKV1, CKVB1 and VSS1 are electrically connected to each other through the first inspection line ISL1.

The second gate driving part GDP2 is electrically connected to input lines, for example, such as a second start signal input line STV2, a third clock input line CKV2, a fourth clock input line CKVB2 and a second ground voltage input line VSS2 that receive various signal externally provided.

The lower substrate 100 includes a second inspection line ISL2 formed at the grinding area G1 and electrically connected to the input lines STV2, CKV2, CKVB2 and VSS2. Thus, the input lines STV2, CKV2, CKVB2 and VSS2 are electrically connected to each other through the second inspection line ISL2.

The first and second ground voltage input lines VSS1 and VSS2 have a width wider than those of the input lines STV1, CKV1, CKVB1, STV2, CKV2 and CKVB2. Thus, the first ground voltage input line VSS1 receives an inspection signal externally provided and provides the received inspection signal to the first inspection line ISL1, and the second ground voltage input line VSS2 receives the inspection signal and provides the received inspection signal to the second inspection line ISL2.

When the inspection signal is provided to the first ground voltage input line VSS1 in a visual inspection process, the inspection signal is provided to the first start signal input line STV1, first clock input line CKV1 and second clock input line CKVB1 through the first inspection line ISL1.

Also, when the inspection signal is provided to the second ground voltage input line VSS2, the inspection signal is provided to the second start signal input line STV2, third clock input line CKV2 and fourth clock input line CKVB2 through the second inspection line ISL2.

The inspection signal is provided to each stage of the first gate driving part GDP1 so as to drive the plural stages SRC1-SRCn. Thus, the odd gate lines GL1, ..., GLn−1 connected to the plural stages SRC1-SRCn may substantially simultaneously receive the driving signal from the plural stages SRC1-SRCn.

Also, the inspection signal is provided to each stage of the second gate driving part GDP2 so as to drive the plural stages SRC1-SRCn. Thus, the even gate lines GL2, ..., GLn connected to the plural stages SRC1-SRCn may substantially simultaneously receive the driving signal from the plural stages SRC1-SRCn.

Although not shown in FIGS. 1 to 7, the assembled substrates 300 and 400 for the display panel may be an assembled substrate for an LCD panel having a lower substrate 100, an upper substrate 200 and a liquid crystal layer (not shown) disposed between the lower and upper substrates 100 and 200.

Figure 8:
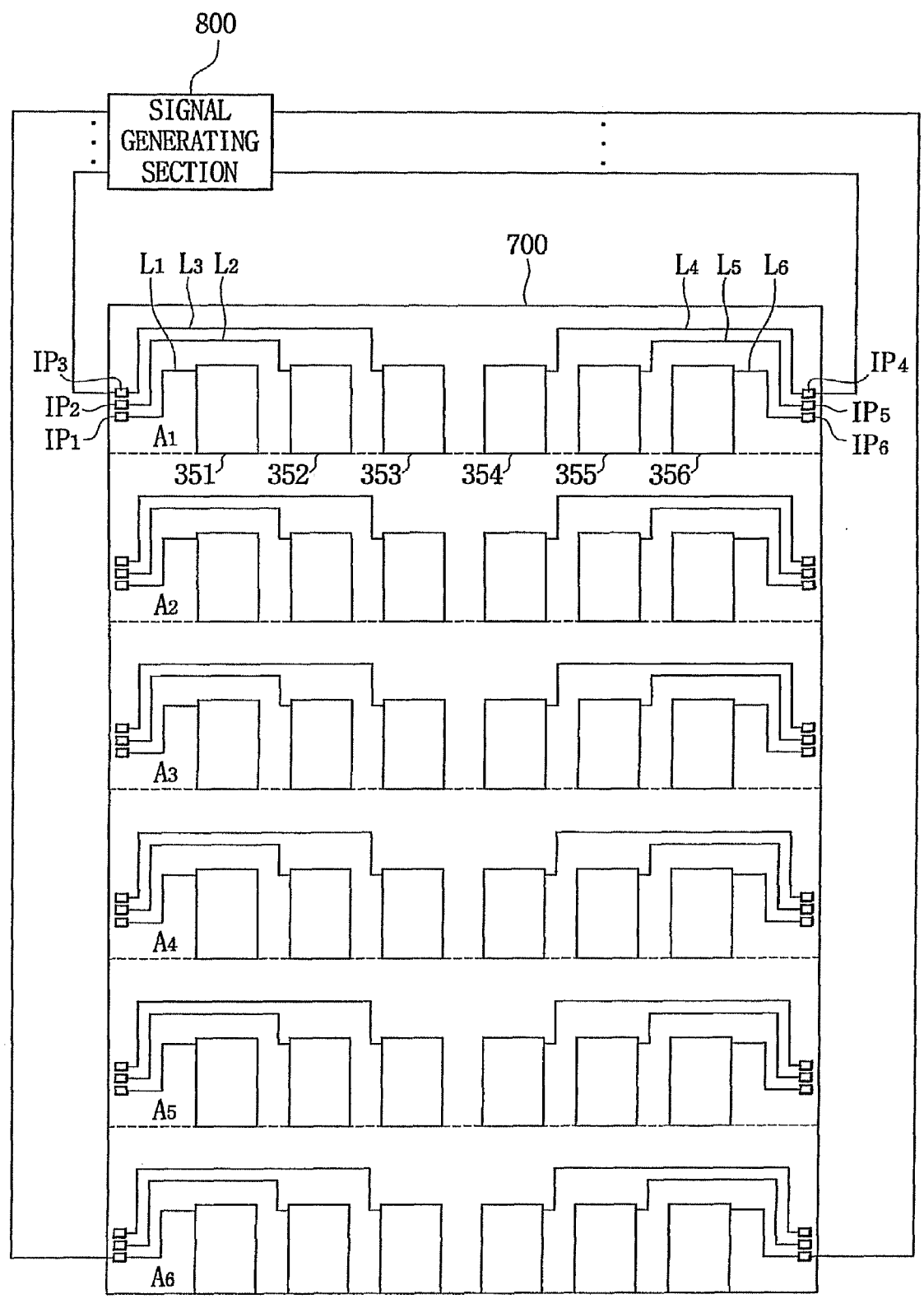
FIG. 8 is a schematic view showing a mother substrate according to another exemplary embodiment of the present invention.

FIG. 8 is a schematic view showing a mother substrate according to another exemplary embodiment of the present invention.

Referring to FIG. 8, a mother substrate 700 includes first, second, third, fourth, fifth and sixth areas A1, A2, A3, A4, A5 and A6 having an equal configuration to each other, and thus the first area A1 will be described and a description of the second to sixth areas A2, A3, A4, A5 and A6 will be omitted. In this exemplary embodiment, six-TFT areas formed at the first to sixth areas A1, A2, A3, A4, A5 and A6, respectively, will be described.

The first area A1 includes first, second, third, fourth, fifth and sixth TFT areas 351, 352, 353, 354, 355 and 356. First, second and third inspecting pad parts IP1, IP2 and IP3 are disposed at a left side of the first area A1 so as to receive an inspection signal from a signal generating section 800. The first, second and third inspecting pad parts IP1, IP2 and IP3 are electrically connected to the first, second and third TFT areas 351, 352 and 353 through first, second and third inspection lines L1, L2 and L3, respectively.

Although not shown in FIG. 8, the first, second and third inspection lines L1, L2 and L3 are electrically connected to inspection lines formed in the first, second and third TFT areas 351, 352 and 353. Thus, the first, second and third TFT areas 351, 352 and 353 may be operated in response to the inspection signal, thereby inspecting the first, second and third TFT areas 351, 352 and 353 formed on the mother substrate 700.

Also, fourth, fifth and sixth inspecting pad parts IP4, IP5 and IP6 are disposed at a right side of the first area A1 so as to receive the inspection signal from the signal generating section 800. The fourth, fifth and sixth inspecting pad parts IP4, IP5 and IP6 are electrically connected to the fourth, fifth and sixth TFT areas 354, 355 and 356 through fourth, fifth and sixth inspection lines L4, L5 and L6, respectively.

Although not shown in FIG. 8, the fourth, fifth and sixth inspection lines L4, L5 and L6 are electrically connected to inspection lines formed in the fourth, fifth and sixth TFT areas 354, 355 and 356. Thus, the fourth, fifth and sixth TFT areas 354, 355 and 356 may be operated in response to the inspection signal, thereby inspecting the fourth, fifth and sixth TFT areas 354, 355 and 356 formed on the mother substrate 700.

Figure 9:
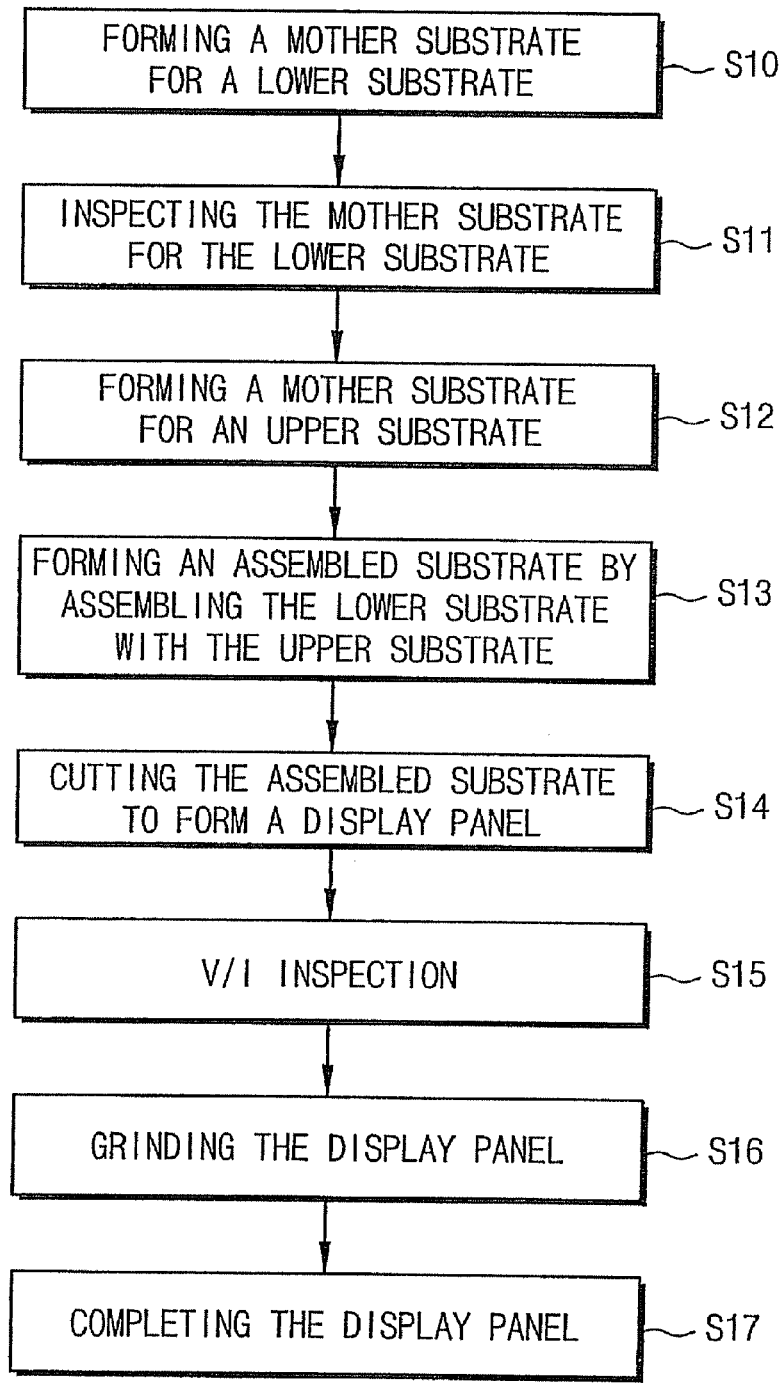
FIG. 9 is a flowchart illustrating a method of manufacturing a display panel according to another exemplary embodiment of the present invention.
Figure 10A:
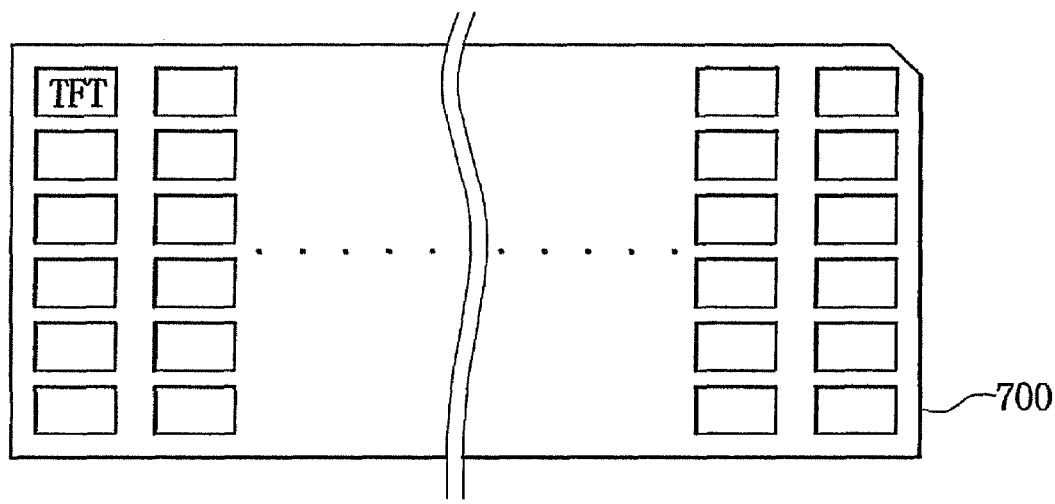
FIG. 10A is a schematic view showing a mother substrate manufactured by the method shown in FIG. 9.
Figure 10B:
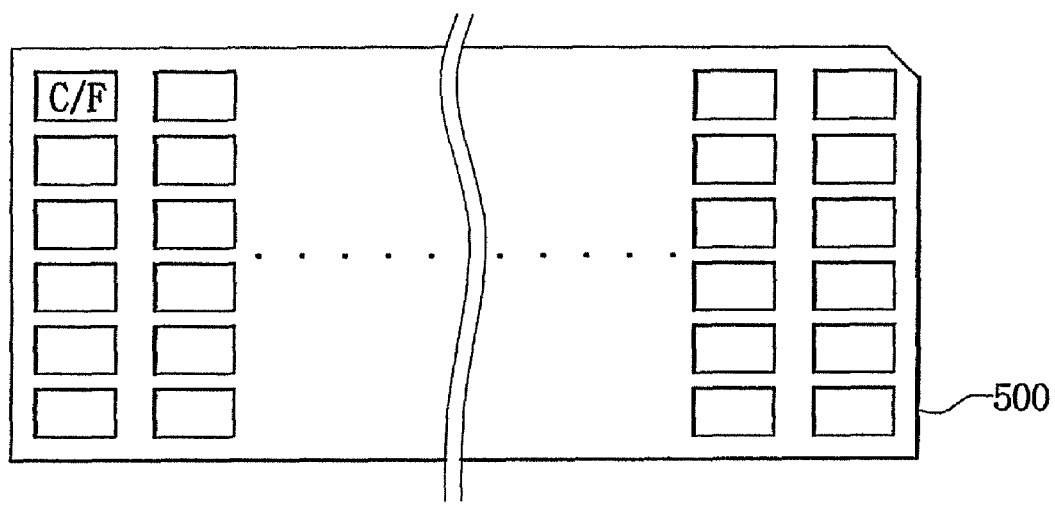
FIG. 10B is a schematic view showing a mother substrate for an upper substrate manufactured by the method shown in FIG. 9.

FIG. 9 is a flowchart illustrating a method of manufacturing a display panel according to another exemplary embodiment of the present invention. FIG. 10A is a schematic view showing a mother substrate manufactured by the method shown in FIG. 9. FIG. 10B is a schematic view showing a mother substrate for an upper substrate manufactured by the method shown in FIG. 9. FIG. 10 is a schematic view showing an assembled substrate manufactured by the method shown in FIG. 9.

Referring to FIGS. 9 and 10A, a mother substrate 700 on which a plurality of TFT areas is formed is completed (step S10). The mother substrate 700 is inspected (step S11).

Particularly, as shown in FIG. 8, when an inspection signal is applied to the first to sixth inspecting pad parts IP1, IP2, IP3, IP4, IP5 and IP6 formed on the mother substrate 700, the inspection signal is applied to each of TFT areas through the first to sixth inspection lines L1, L2, L3, L4, L5 and L6.

By the inspection signal applied to each of TFT areas, a gate driving part GDP is driven to simultaneously output a driving signal to gate lines GL1-GLn. Thus, the TFT areas formed on the mother substrate 700 may be inspected.

Referring to FIGS. 9 and 10B, a mother substrate 500 for an upper substrate on which a plurality of color filter areas C/F is formed is completed (step S12). The color filter areas C/F one-to-one correspond to the TFT areas.

Each of the color filter areas C/F includes a color filter (not shown) having red (R), green (G) and blue (B) color pixels and a common electrode (not shown) used as a second electrode of a liquid crystal capacitor Clc (refer to FIG. 1). The common electrode is formed on the color filter.

Figure 10C:
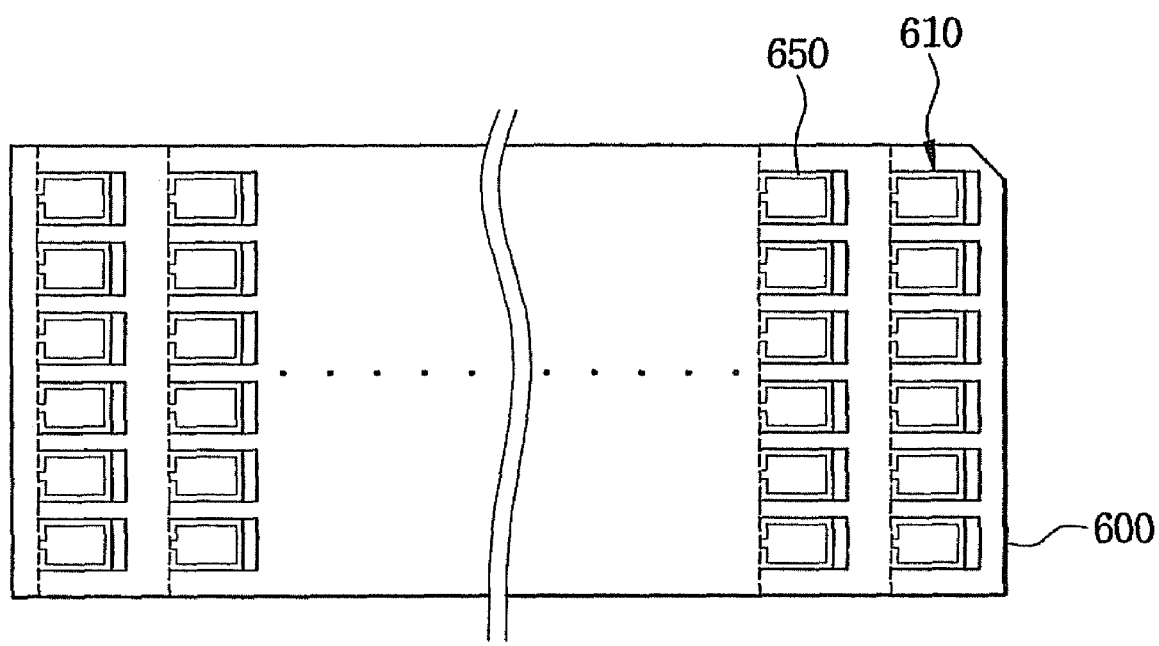
FIG. 10C is a schematic view showing an assembled substrate manufactured by the method shown in FIG. 9.

Referring to FIGS. 9 and 10C, when the completed mother substrate 700 for the lower substrate and the completed mother substrate 500 for the upper substrate are assembled to each other using a sealing member (hereinafter, referred to as sealant) 650 disposed between the completed mother substrate 700 for the lower substrate and the completed mother substrate 500 for the upper substrate, to thereby complete an assembled substrate 600 having a plurality of cells 610 (step S13).

The assembled substrate 600 is cut such that the cells 610 are separated from each other, thereby completing an assembled substrate 300 for a display panel (step S14). Then, in step S15, a visual inspection process is performed so as to inspect whether or not the assembled substrate 300 is operated in normal.

When the visual inspection process is finished, an edge of the assembled substrate 300 for the display panel is grounded (step S16). Thus, the inspection line ISL formed on the assembled substrate 300 for the display panel, and the assembled substrate 300 for the display panel is completed as a display panel (step S17).

According to the mother substrate, substrate for the display panel and the method of manufacturing the display panel, the lower substrate includes the inspection line that receives the first inspection signal, gate driving part electrically connected to the inspection line so as to output the second inspection signal in response to the first inspection signal, and pixel part driven in response to the second inspection signal.

Thus, the pixel part may be easily inspected using the gate driving part while the display panel on which the gate driving part is formed is manufactured, or after the mother substrate and the substrate for the display panel are completed. Accordingly, the display panel may have an enhanced productivity and an improved yield.

Although the exemplary embodiments of the present invention have been described, it is understood that the present invention should not be limited to these exemplary embodiments, but various changes and modifications can be made by one ordinary skilled in the art within the spirit and scope of the present invention as hereinafter claimed.

What is claimed is:

1. A method of manufacturing display panel, the method comprising:
    forming a substrate having a first signal line disposed on a peripheral area, a driving part formed at the substrate and electrically connected to the first signal line, a second signal line electrically coupled to the driving part, an inspection signal line connected to the first signal line and a pixel part formed on the substrate and electrically coupled to the second signal line;
    providing an inspection signal to the driving part through the inspection signal line thereby driving the pixel part so as to inspect the substrate; and
    removing the inspection line
    so that a first end of the first signal line is electrically coupled to the driving part and a second end of the first signal line extends to an edge of the substrate.

2. The method of claim 1, wherein removing the inspection line comprises grinding the substrate with the inspection line.

3. The method of claim 1, wherein the first signal line transmits a control signal to the driving part and the driving part provide a scanning signal to the pixel part.

4. The method of claim 3, wherein the control signal is one of a start signal, a clock signal and a driving voltage input signal.

5. The method of claim 1, wherein the first signal line comprises a start signal input line, a clock signal input line and a driving voltage input line.

6. The method of claim 5, wherein the driving voltage input line has a width wider than those of the start signal input line and clock signal input line.

7. The method of claim 1, wherein the pixel part comprises a plurality of gate lines extending to a first direction, a plurality of data lines extending to a second direction and a plurality of thin film transistor electrically coupled to the data lines and the gate lines, wherein the driving part provides a gate signal to the gate lines.

8. The method of claim 1, wherein the first signal line transmits a control signal to the driving part and the driving part provide a scanning signal to the pixel part.

9. The method of claim 8, wherein the control signal is one of a start signal, a clock signal and a driving voltage input signal.

10. The method of claim 1, wherein the first signal line comprises a start signal input line, a clock signal input line and a driving voltage input line.

11. The method of claim 10, wherein the driving voltage input line has a width wider than those of the start signal input line and clock signal input line.

* * * * *